United States Patent [19]

Lee

[11] Patent Number: 4,626,001
[45] Date of Patent: Dec. 2, 1986

[54] FLUID FITTING WITH HIGH TEMPERATURE CAPABILITIES

[75] Inventor: Francis C. K. Lee, Westchester, Calif.

[73] Assignee: The Deutsch Company Metal Components Division, Gardena, Calif.

[21] Appl. No.: 601,007

[22] Filed: Apr. 16, 1984

[51] Int. Cl.⁴ .............................................. F16L 13/14
[52] U.S. Cl. ...................................... 285/94; 285/173;
285/187; 285/329; 285/331; 285/382.2;
285/905; 29/508; 29/516
[58] Field of Search ................ 285/94, 173, 187, 256,
285/258, 259, 329, 331, 381, 382, 382.1, 382.2,
DIG. 6, DIG. 15, DIG. 24; 29/508, 516

[56] References Cited
U.S. PATENT DOCUMENTS

| Re. 28,457 | 7/1975 | Dawson | 285/382.2 |
|---|---|---|---|
| 1,939,373 | 12/1933 | Tilley | 285/187 |
| 2,028,316 | 1/1936 | Brunner | 285/256 |
| 2,517,669 | 8/1950 | Hufferd et al. | 285/256 |
| 2,577,049 | 12/1951 | Uline | 285/256 |
| 2,741,498 | 4/1956 | Elliott | 285/382.2 |
| 2,926,029 | 2/1960 | St. Clair et al. | 285/256 |
| 3,262,719 | 7/1966 | Gemma | 285/381 |
| 3,294,682 | 12/1966 | MacKinnon | 285/94 |
| 3,345,091 | 10/1967 | Nicol | 29/508 |
| 3,378,282 | 4/1968 | Demler | 29/508 |
| 3,507,522 | 4/1970 | Froman et al. | 285/187 |
| 3,525,542 | 8/1970 | Belart et al. | 285/256 |
| 3,589,752 | 6/1971 | Spencer | 285/259 |
| 3,689,112 | 9/1972 | Slator et al. | 285/382 |
| 3,869,393 | 3/1975 | Booker | 285/94 |
| 3,893,718 | 7/1975 | Powell | 285/382.2 |
| 4,114,930 | 9/1978 | Perkins et al. | 285/334.5 |
| 4,328,982 | 5/1982 | Christianson | 285/369 |
| 4,359,812 | 11/1982 | Haag et al. | 29/516 |

FOREIGN PATENT DOCUMENTS

| 2245569 | 4/1974 | Fed. Rep. of Germany | 285/259 |
|---|---|---|---|
| 706420 | 6/1931 | France | 285/382.2 |
| 121225 | 10/1978 | Japan | 285/331 |
| 1012846 | 12/1965 | United Kingdom | 285/187 |
| 883587 | 11/1981 | U.S.S.R. | 285/DIG. 6 |

Primary Examiner—Cornelius J. Husar
Assistant Examiner—Eric K. Nicholson
Attorney, Agent, or Firm—Gausewitz, Carr & Rothenberg

[57] ABSTRACT

This invention provides a fluid fitting made up of telescoping sleeves providing an annular space therebetween adapted to receive the end of a tube. The outer sleeve is attached to the inner sleeve by being deflected around annular ridges at one end of the inner sleeve. The sleeves are attached to the tube by swaging the outer sleeve so as to grip the tube between the two sleeves. Grooves in the inner sleeve provide corners which dig into the inner surface of the tube and provide seals and retention, while recesses in the outer sleeve receive deflected material of the tube to prevent rotation.

15 Claims, 8 Drawing Figures

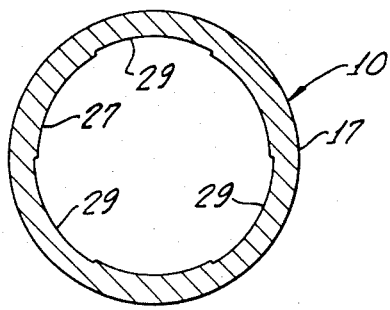
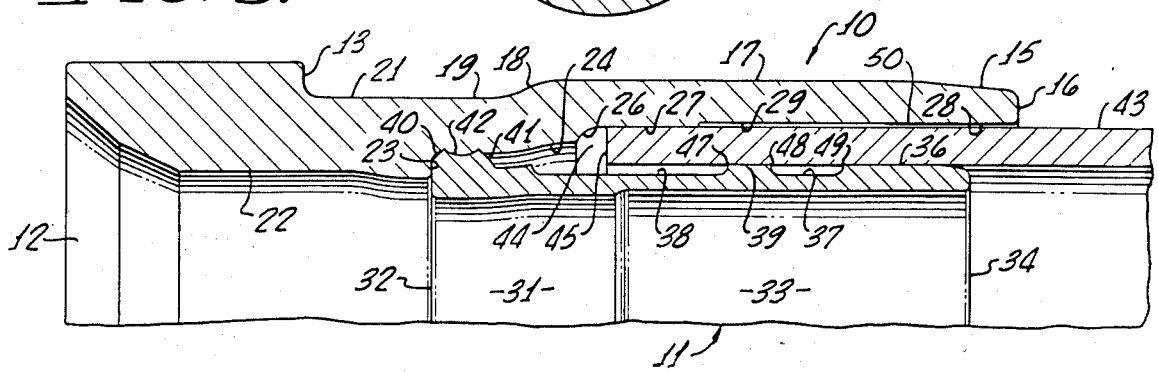
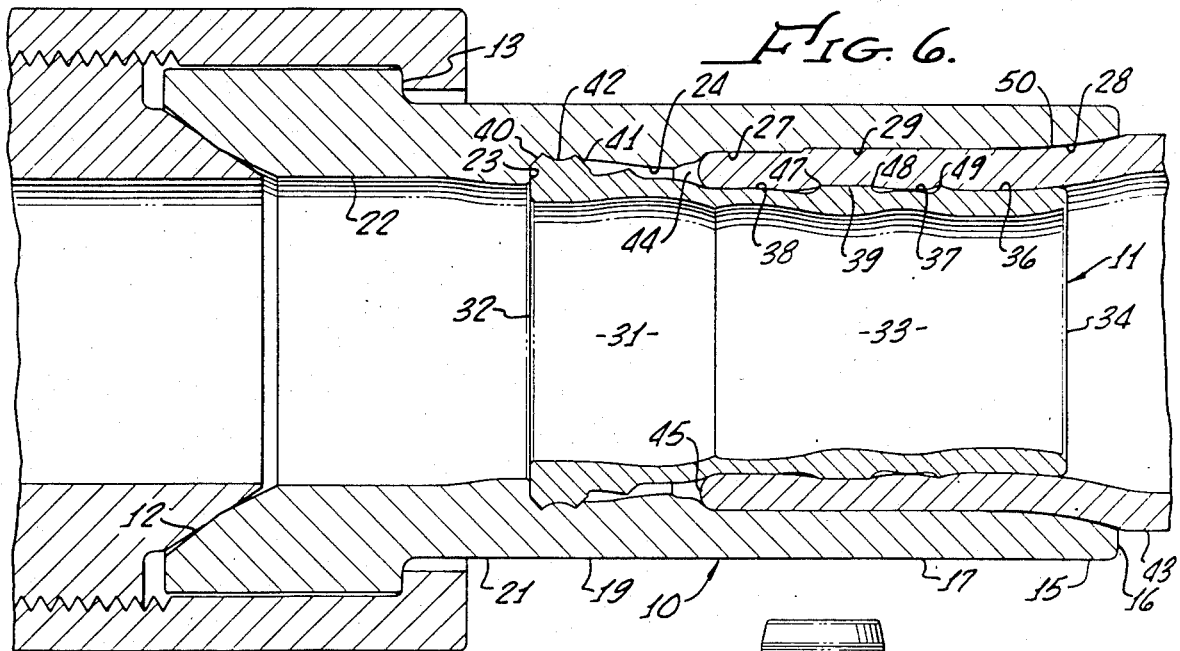
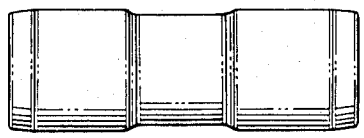
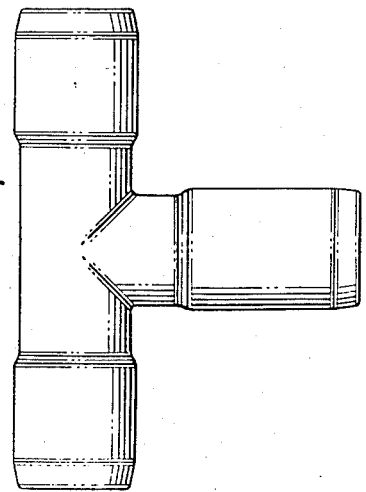

FLUID FITTING WITH HIGH TEMPERATURE CAPABILITIES

BACKGROUND OF THE INVENTION

Fluid fittings attached by swaging offer certain advantages resulting in extensive use in certain types of installations. An example is the design of U.S. Pat. No. Re. 28,457. However, these fittings require a separate sealing material in grooves and are not suitable for high temperature use. Another prior swaged fitting is shown in U.S. Pat. No. 4,328,982, which is some instances does away with a separate sealing element, providing a metal-to-metal seal. However, again the design is not adapted for extremely high temperature use.

BRIEF SUMMARY OF THE INVENTION

The present invention provides an improved fluid fitting overcoming the problems encountered in the prior art. It is adapted for use in extremely high temperature environments such as in the connections for jet aircraft engines. The fitting provides superior strength at lower temperatures as well.

The fitting includes inner and outer sleeves telescoped together so as to provide an annular space adapted to receive the end of a tube. The inner and outer sleeves are secured together by rolling a localized area of the outer sleeve so as to deflect its inner walls around annular ridges on the inner end of the inner sleeve. This is a factory operation. The inner sleeve includes annular grooves in its outer surface which provide lands and sharp corners that dig into the inner wall of the tube when a radial swaging force is applied to the external sleeve. The result is a strong attachment and a metal-to-metal seal. There are spaced longitudinal shallow recesses in the inner wall of the outer sleeve into which the outer surface portions of the tube are deflected when the swaging takes place. This prevents relative rotation between the tube and the fitting.

High temperature resistance is assured by proper selection of the coefficients of thermal expansion of the materials of the sleeves and the tube. To achieve this, the inner sleeve should have a greater coefficient of thermal expansion than that of the outer sleeve and the tube. As a result, as temperatures increase the inner sleeve expands at a greater rate than the tube and outer sleeve, and presses more and more tightly against the inner wall of the tube. Similarly, the inner sleeve expands at a greater rate than the outer sleeve and becomes more tightly pressed against the inner wall of the outer sleeve at the location of their attachment. Therefore, the connection and the seal do not deteriorate as temperatures increase, being enhanced instead.

The fitting may be made in a variety of forms for coupling tubes together or joining them to other components of a system.

DESCRIPTION OF THE DRAWINGS

FIG. 4 is a transverse sectional view of the outer sleeve of the fitting, taken along line 4—4 of FIG. 1 and illustrating the longitudinal grooves for preventing rotation of a tube to which the fitting is attached;

FIG. 5 is a fragmentary longitudinal sectional view showing a tube inserted into the fitting prior to swaging;

FIG. 6 is a longitudinal view of the fitting as completed and swaged to the tube;

FIG. 7 is a plan view of a fitting made as a coupling; and

FIG. 8 is a plan view of a fitting made as a tee.

DETAILED DESCRIPTION OF THE INVENTION

Figure 1:
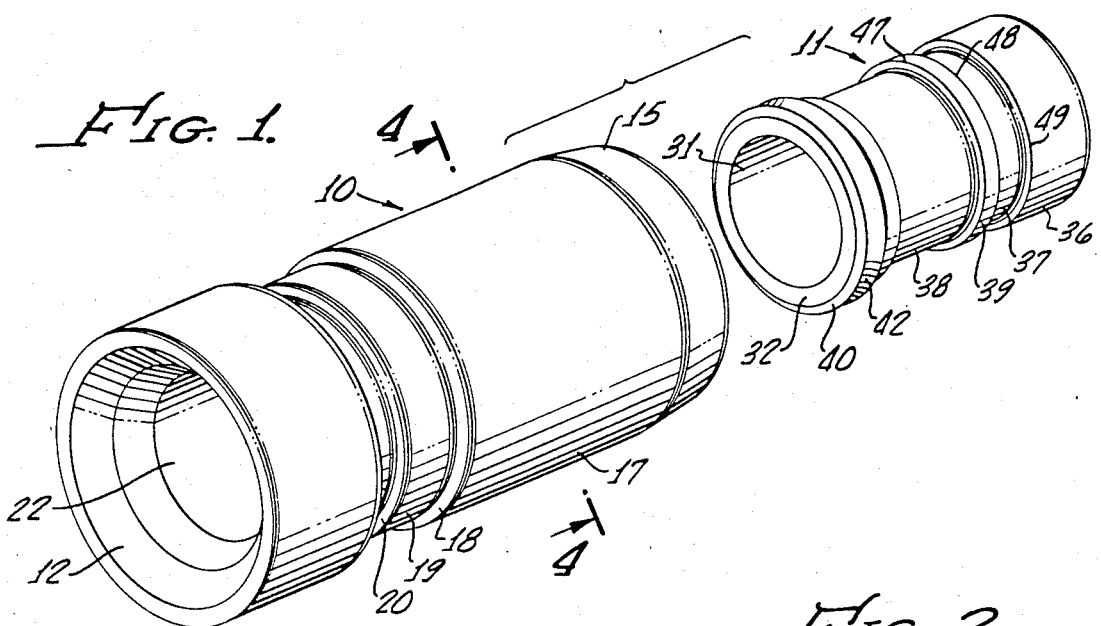
FIG. 1 is an exploded perspective view of the components of the fitting of this invention.

The fitting of this invention is made up of two sleeves 10 and 11. The lefthand end of the sleeve 10, as illustrated, is conventional, including a tapered end surface 12 and an exterior shoulder 13 for connection as an ordinary flared fitting.

The exterior of the sleeve 10 includes a surface 15 that tapers at a shallow angle to one end 16 of the sleeve. At the inner end of the surface 15 is a relatively long cylindrical surface 17. A curved transition surface 18 connects the surface 17 with a shorter cylindrical part 19 of smaller diameter. Beyond the surface 19 is a second curved transition surface 20 to a still shorter cylindrical portion 21 of narrower diameter adjacent the shoulder 13.

Interiorly, the sleeve 10 has a cylindrical portion 22 of constant relatively small diameter adjacent the tapered end surface 12, which connects through a shoulder 23 to a central interior surface 24 of larger diameter. The surface 24 is shorter axially than the surface 22. The sleeve 10 is proportioned so that the shoulder 23 is radially inwardly of the exterior surface 19 of the sleeve and the transition surface 18 on the exterior of the sleeve 10 is outwardly of the internal surface 24.

A rounded shoulder 26 connects the surface 24 to an additional interior cylindrical surface 27 of still greater diameter. The surface 27 connects to a surface 28 of slightly larger diameter, which forms the entrance to the fitting at the end 16. There are, in addition, three equally spaced axially extending broached slots 29 in the surface 27 which carry the diameter of the entrance surface 28 to their inner ends, which are spaced from the shoulder 26. These slots provide an anti-rotational affect when the fitting is swaged onto a tube, as discussed below.

This construction provides the sleeve 10 with a thinner wall at the surfaces 27 and 28 then the wall on the opposite side of the shoulder 26. The sleeve 10 has its greatest wall thickness beyond the shoulder 23.

The sleeve 11 is of smaller diameter than the sleeve 10 and of lesser wall thickness. It is made of a material having a greater coefficient of thermal expansion than that of the sleeve 10. The material of the sleeve 11 also is harder than that of the sleeve 10, and has a higher yield strength. The sleeve 11 includes a first cylindrical interior surface 31 adjacent one end 32, and a longer cylindrical surface 33 that connects to the surface 31 and is of slightly larger diameter. The surface 33 extends all the way to the opposite end 34 of the sleeve 11.

Exteriorly, the sleeve 11 has a rounded exterior edge that leads to a cylindrical exterior surface 36 adjacent the end 34. An annular groove 37 interrupts the surface 36 inwardly of the end 34. A short distance from the annular groove 37 is a much wider annular groove 38, which is of the same depth as the groove 37. This leaves a land 39 between the grooves 37 and 38. At the end 32 of the sleeve 11 is an exterior annular enlargement that includes a tapered outer end wall 40 and a tapered inner end wall 41 that connects to the inner end part of the surface 36 beyond the wide groove 38. The enlargement is provided with a shallow arcuate annular groove 42 in its outer periphery. The intersections of the surfaces 40 and 41 with the surface of the groove 42 produce two closely spaced annular ridges.

Figure 2:
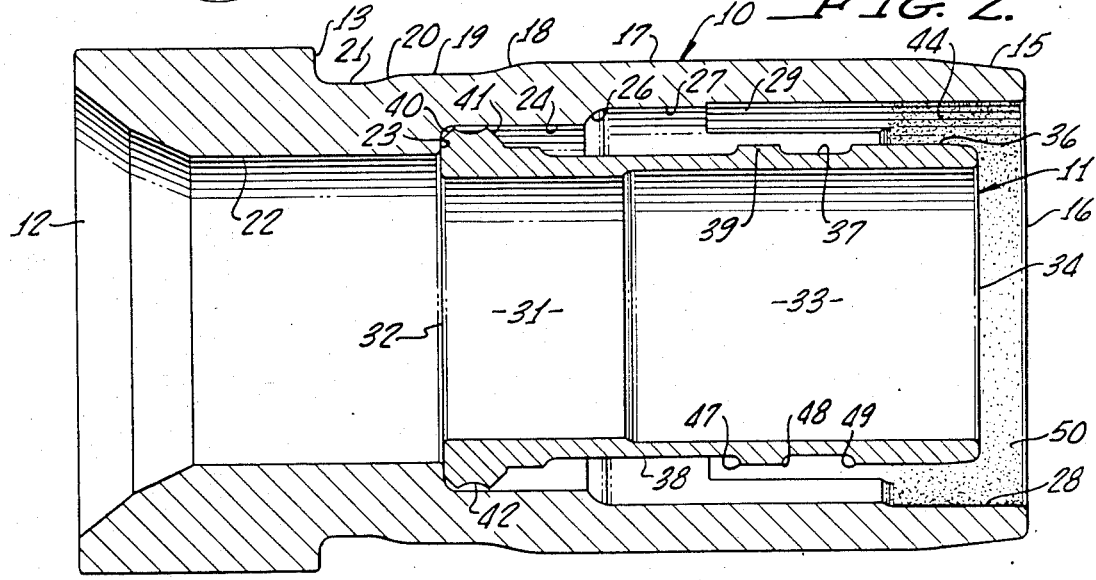
FIG. 2 is a longitudinal section showing the components of the fitting as intially assembled.
Figure 3:
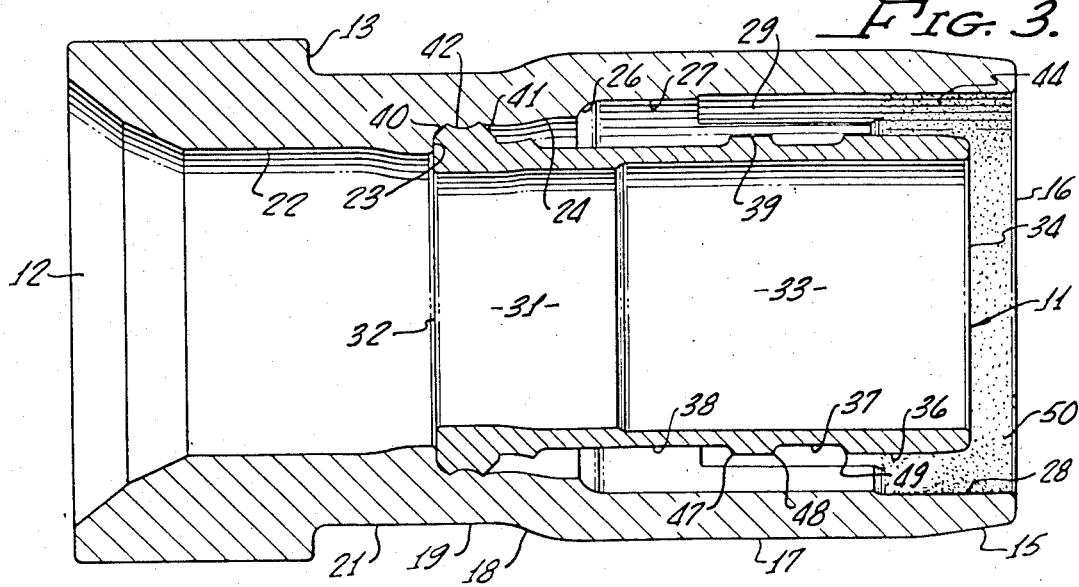
FIG. 3 is a view similar to FIG. 2, but with the two sleeves attached together.

Initially the sleeve 11 is positioned within the sleeve 10, as shown in FIG. 2, with the sleeve end 32 intermediate the ends of the sleeve 10, abutting the interior shoulder 23 of the sleeve. The end 34 of the sleeve 11 is adjacent but recessed axially inwardly of the end 16 of the outer sleeve 10. A compressive force then is applied to the sleeve 10 at the surface 91, rolling this portion of the sleeve radially inwardly to attach the sleeves 10 and 11 together, as seen in FIG. 3. This deflects the exterior surface 19 inwardly to the level of the exterior surface 21 of the sleeve 10, causing the material of the inner wall of the sleeve 10 at the surface 24 to be deflected inwardly into the annular groove 42 and around the annular ridges defined by the end enlargement of the sleeve 11. Thus, the material of the sleeve 10 is deflected inwardly around the tapered surface 40 and the end 32 of the sleeve 11, as well as being deflected around the tapered surface 41. This forms a secure attachment and a fluid seal between the two sleeves.

The tube 43, to be attached to the fitting, is introduced into the annular space 44 between sleeves 10 and 11, as seen in FIG. 5. The end 45 of the tube 43 is advanced past the land 39 of the sleeve 11, normally being positioned adjacent the shoulder 26 that connects the internal diameter portions 24 and 27 of the sleeve 10. Preferably the parts are proportioned so that the tube 43 can enter the space between the sleeves 10 and 11 freely, yet without much clearance. The materials of the components of the fitting are selected so that the inner sleeve 11 has a coefficient of thermal expansion greater than that of the tube 43. The coefficient of thermal expansion of the sleeve 10 may be less than that of the tube 43.

Next the fitting is swaged to complete the attachment to the tube 43. This is accomplished by applying an external compressive force by a radial swaging tool on the surface 17 of the sleeve 10. This forces the surface 17 radially inwardly until it is of substantially the same diameter as that of the surface 19 of the sleeve 10. As this occurs, the inner wall of the sleeve 10 presses against the tube 43, which is forced inwardly against the outer surface of the sleeve 11. The latter experiences some deflection but resists the inward compression sufficiently to cause the inner surface of the tube 43 to be deflected inwardly around the land 39 and against the surface of the sleeve 11 at the grooves 37 and 38. As a result, the corners 47 and 48 at either end of the land 39 are caused to dig into the inner surface of the tube 43. Similarly, the corner 49 at the outer end of the groove 37 of the sleeve 11 becomes embedded in the inner surface of the tube 43. This creates metal-to-metal seals at the locations of these corners, effectively preventing the leakage of fluid along the inner surface of the end part of the tube 43. At the same time, the deflection of the tube securely attaches it to the sleeve 11.

The exterior of the tube 43 is forced into the three spaced broached grooves 29, which prevents rotation of a tube relative to the sleeves 10 and 11.

The inner sleeve 11, being of relatively hard material with a high yield strength, can resist the compression force of the swaging so that the tube deflects as described above. The relatively thin wall of the sleeve 11 maximizes the internal diameter of this sleeve so that the fitting will not unduly restrict the flow of fluid. The outer sleeve 10, being more malleable than the inner sleeve and of lesser yield strength, can compress the tube in the swaging operation and hold it inwardly against the sleeve 11. The malleability of the sleeve 10 assists the fitting in withstanding bending forces on the tube to which it is attached.

The fitting is well suited for use at elevated temperatures, such as in the environment of jet aircraft engines. As the components become elevated in temperature, the sleeve 11 becomes pressed even more tightly against the inner wall of the tube 43. This comes about from the coefficients of thermal expansion of these elements. The sleeve 11, by having a greater coefficient of thermal expansion than that of the tube 43, will maintain an increasing outward pressure against the inner wall of the tube as temperatures rise. Similarly, because the sleeve 11 has a greater coefficient of thermal expansion than that of the sleeve 10, it will have a greater outward force against the sleeve 10 at the connection between the two as temperatures rise. The tube 43 can be made to increase its force against the outer sleeve 10 when the latter is made of a material having a smaller coefficient of thermal expansion than that of the tube. Thus, the fitting does not lose its properties at elevated temperatures, always being mechanically held together securely with an effective metal-to-metal seal.

Performance under flexure is improved significantly by the application of a thin coating of dry film lubricant 50 on the bore entrance surface 28 of the sleeve 10. The lubricant will impregnate the surface 28, filling in low spots to provide a uniform and smooth surface. Metal-to-metal contact between the sleeve 10 and the tube 43 is avoided at the zone where the dry lubricant is present. As a result, the fitting does not scuff the tube at the surface 28 under vibration and greatly extended tube life is obtained. Without the lubricant, the roughness from normal machining of the surface 28 may produce stress risers on the tube 43 that can lead to tube failure under vibration. Only a very thin film of lubricant is needed, most of it penetrating the surface 28. A solid film extreme environment dry lubricant, such as a molybdenum disulfide base mixed with graphite, of a total thickness of 0.0005 inch, is effective up to 1100° F.

In addition to flexing, the fitting also withstands severe tensile loads, impulse loads and other adverse conditions.

Although shown in the previously described embodiment as used in conjunction with a conventional flared fitting at one end, a fitting manufactured in accordance with this invention may have many other configurations. For example, as shown in FIG. 7, the fitting 51 is a coupling, both ends of which are to receive tube ends just as did the right-hand end portion of the fitting as illustrated in FIGS. 1-6. After swaging the tubes will be connected together.

FIG. 8 shows one of the other embodiments of the invention, this time as a tee 52.

The foregoing detailed description is to be clearly understood as given by way of illustration and example only, the spirit and scope of this invention being limited solely by the appended claims.

What is claimed is:

1. A fluid fitting comprising
   a first sleeve,
   a second sleeve, said first sleeve being more malleable than said second sleeve, said second sleeve being harder than said first sleeve, having a greater yield strength than that of said first sleeve, and having a greater coefficient of thermal expansion than that of said first sleeve, said first sleeve having a first end, a second end and an internal shoulder intermediate said ends thereof, said second sleeve being received in said first sleeve and having a first end abutting said shoulder and a second end adjacent said second end of said first sleeve, said first and second sleeves defining an annular space therebetween from said second end of said second sleeve to a location adjacent said shoulder adapted to receive a tube to be connected to said first and second sleeves, said first and second sleeves including means for securing said first sleeve to said second sleeve and forming a fluid seal therebetween adjacent said shoulder of said first sleeve, said means including an annular ridge on said second sleeve adjacent said first end thereof, said first sleeve being compressed inwardly so that the interior surface of said first sleeve is deflected around said annular ridge, said second sleeve including a duality of annular grooves in its exterior surface inwardly of said second end thereof so as to define a land between said grooves having relatively sharp corners at the ends of said land, said first sleeve being swageable inwardly toward said second sleeve for forcing such a tube into said grooves and causing said corners to dig into said tube, said first sleeve including a counterbore in said second end thereof, and a dry film lubricant on the surface of said counterbore for preventing metal-to-metal contact between said first sleeve and said tube at said counterbore so that said tube is not scuffed and caused to fail under vibration.

2. A device as recited in claim 1 in which said annular ridge has an annular groove in the outer surface thereof and tapered end walls connected to said annular groove so as to provide a duality of annular sharp edges, said interior surface of said first sleeve being deflected into said annular groove and onto said edges so that said edges are embedded in said interior surface of said first sleeve.

3. A device as recited in claim 1, in which said first sleeve as provided with spaced recess means in the inner surface thereof for receiving deflected exterior portions of such a tube upon such compression of said first sleeve, for thereby preventing rotation of said tube relative to said first sleeve.

4. A device as recited in claim 3, in which said spaced recess means include a pluarlity of longitudinal grooves in said inner surface of said first sleeve.

5. A device as recited in claim 1, in which the wall thickness of said first sleeve extending inwardly from said second end thereof to a location beyond said land of said second sleeve is less than the wall thickness of said first sleeve inwardly of said location.

6. A device as recited in claim 1, in which the wall thickness of said second sleeve is thinner for a distance extending inwardly from said second end thereof to a location past said land than is the wall thickness of said second sleeve adjacent said first end thereof.

7. A device as recited in claim 1, in which said second end of said second sleeve is recessed axially inwardly of said second end of said first sleeve.

8. In combination with a tube having a predetermined coefficient of thermal expansion, a fluid fitting comprising an assembly including
a first sleeve having an internal shoulder intermediate the ends thereof,
a second sleeve shorter than said first sleeve and received in said first sleeve,
said second sleeve having an annular ridge at a first end thereof, and a second end adjacent one end of said first sleeve,
said annular ridge engaging said shoulder, said first sleeve being deflected inwardly around said annular ridge for securing said first and second sleeves together and forming a fluid seal therebetween,
the outer wall of said second sleeve being spaced from the inner wall of said first sleeve from adjacent said first end to said second end of said second sleeve so as to leave an annular space between said first and second sleeves, said tube being received in said space,
said second sleeve having a duality of annular grooves in the exterior surface thereof so as to define a land therebetween with sharp corners at the ends of said land,
said first sleeve being deflected inwardly so that said tube is compressed and deflected into said annular grooves and said corners of said land dig into the surface of said tube for connecting said tube to said first and second sleeves,
said second sleeve having a coefficient of thermal expansion which is greater than said predetermined coefficient of thermal expansion of said tube and greater than the coefficient of thermal expansion of said first sleeve, said first sleeve having an entrance conterbore extending inwardly a limited distance from said one end thereof, and
a dry film lubrianct on the surface of said entrance counterbore for preventing metal-to-metal engagement between said tube and said first sleeve at said entrance so that said first sleeve does not scuff said tube and cause failure thereof under vibration.

9. A device as recited in claim 8 in which said first sleeve has a coefficient of thermal expansion which is less than said predetermined coefficient of thermal expansion of said tube.

10. A device as recited in claim 8, in which said second sleeve from said ridge to said second end thereof has less wall thickness than that of said ridge to said second end thereof has less wall thickness than that of said first sleeve.

11. A device as recited in claim 8, in which said duality of grooves includes a first relatively narrow annular groove adjacent said second end of said second sleeve, and a second relatively wide annular groove spaced inwardly from said first annular groove so as to leave said land between said annualr grooves and provide said corners at either end of said land.

12. The method of connecting a fitting to a tube comprising the steps of providing a first sleeve of a material having a first coefficient of thermal expansion, providing a second sleeve of a material having a second coefficient of thermal expansion greater than that of said first sleeve and with an annular external ridge means, inserting said second sleeve into said first sleeve so as to provide an annular space therebetween and to position said ridge means within said first sleeve inwardly of said annular space, securing said first sleeve to said second sleeve inwardly of said annular space by engaging said first sleeve outwardly of said ridge means and locally compressing said first sleeve inwardly so as to be deflected around said annular ridge means and to form a seal therewith, inserting into said annular space the end of a tube of a material having a coefficient of thermal expansion less than said coefficient of thermal expansion of the material of said second sleeve, and then compressing said first sleeve so as to grip said end of said tube between said first and second sleeves.

13. The method as recited in claim 12 in which prior to said compressing of said first sleeve said ridge means is provided with tapered end walls and an annular groove in the outer surface thereof connecting to said end walls so as to define sharp edges around said ridge means, said first sleeve being deflected into said annular groove and onto said sharp edges so that said sharp edges dig into the inner surface of said first sleeve.

14. The method as recited in claim 12 including the steps of providing a counterbore in said one end of said first sleeve, and applying a thin layer of dry film lubricant to said first sleeve at said counterbore for preventing metal-to-metal contact between said first sleeve and said tube at said one end of said first sleeve so that said first sleeve does not scuff and cause failure of said tube under vibration.

15. The method as recited in claim 12 in which said first coefficient of thermal expansion of said material of said first sleeve is less than the coefficient of thermal expansion of said material of said tube.

* * * * *

UNITED STATES PATENT AND TRADEMARK OFFICE
CERTIFICATE OF CORRECTION

PATENT NO. : 4,626,001

DATED : Dec. 2, 1986

INVENTOR(S) : Francis C. K. Lee

It is certified that error appears in the above-identified patent and that said Letters Patent is hereby corrected as shown below:

Claim 10 (column 6, lines 57 to 59), delete "ridge to said second end thereof has less wall thickness than that of said".

Signed and Sealed this

Tenth Day of March, 1987

*Attest:*

DONALD J. QUIGG

*Attesting Officer*  *Commissioner of Patents and Trademarks*